United States Patent
Zhu et al.

(10) Patent No.: US 8,457,434 B2
(45) Date of Patent: Jun. 4, 2013

(54) SPATIAL DIFFUSION IN IMAGES

(75) Inventors: Li Hua Zhu, Beijing (CN); Guang Fei Zhu, Beijing (CN); Jiheng Yang, Beijing (CN)

(73) Assignee: Thomson Licensing (FR)

( * ) Notice: Subject to any disclaimer, the term of this patent is extended or adjusted under 35 U.S.C. 154(b) by 1100 days.

(21) Appl. No.: 12/229,249

(22) Filed: Aug. 21, 2008

(65) Prior Publication Data

US 2009/0067740 A1 Mar. 12, 2009

(30) Foreign Application Priority Data

Sep. 6, 2007 (EP) .................................... 07301345

(51) Int. Cl.
*G06K 9/40* (2006.01)
*G09G 5/00* (2006.01)

(52) U.S. Cl.
USPC .......................................... 382/261; 345/616

(58) Field of Classification Search
USPC .................. 382/260–265; 345/611, 615, 616
See application file for complete search history.

(56) References Cited

U.S. PATENT DOCUMENTS

| | | | | |
|---|---|---|---|---|
| 5,351,314 | A * | 9/1994 | Vaezi .............................. | 382/264 |
| 7,146,059 | B1 * | 12/2006 | Durand et al. ................. | 382/260 |
| 7,831,097 | B2 * | 11/2010 | Chen et al. ..................... | 382/207 |
| 2002/0102017 | A1 * | 8/2002 | Kim et al. ...................... | 382/164 |
| 2003/0095121 | A1 | 5/2003 | Huseyim et al. | |
| 2006/0165258 | A1 * | 7/2006 | Avidan .......................... | 382/103 |
| 2006/0242218 | A1 * | 10/2006 | Okada et al. .................. | 708/490 |
| 2007/0189627 | A1 * | 8/2007 | Cohen et al. .................. | 382/254 |
| 2007/0273686 | A1 * | 11/2007 | Watanabe et al. ............. | 345/419 |
| 2007/0279500 | A1 * | 12/2007 | Castorina et al. ............. | 348/254 |
| 2008/0051660 | A1 * | 2/2008 | Kakadaris et al. ............ | 600/454 |
| 2008/0100621 | A1 * | 5/2008 | Aharon et al. ................ | 345/424 |
| 2008/0137943 | A1 * | 6/2008 | Lee et al. ....................... | 382/165 |
| 2008/0285853 | A1 * | 11/2008 | Bressan ......................... | 382/169 |
| 2008/0317358 | A1 * | 12/2008 | Bressan et al. ................ | 382/224 |

OTHER PUBLICATIONS

Weiss, B. ("Fast Median and Bilateral Filtering," SIGGRAPH, Jul. 2006, pp. 519-526).*
Comaniciu et al. ("Mean Shift: A Robust Approach Toward Feature Space Analysis," IEEE Transactions on Pattern Analysis and Machine Intelligence, vol. 24, No. 5, May 2002.*
Tomasi C et al.: "Bilateral filtering for gray and color images" Sixth International Conference on Computer Vision (IEEE Cat. No. 98CH36271) Narosa Publishing House New Delhi, India, 1998, pp. 839-846, XP002471367.
Durand F. et al.: "Fast Bilateral Filtering for the Display of High-Dynamic-Range Images" ACM Transactions on Graphics, ACM, New York, NY, US, vol. 21, No. 3, Jul. 2002, pp. 257-266, XP002312495.

(Continued)

*Primary Examiner* — Yubin Hung
(74) *Attorney, Agent, or Firm* — Jack Schwartz and Associates, PLLC

(57) ABSTRACT

The invention is related to spatial diffusion in images. Spatial diffusion helps blurring small discontinuities. Edges become sharper by spatial diffusion as well.
A method for generating a spatial diffused image from an input image is described wherein the method comprises applying on the input image an inverted Gaussian spatial bilateral filter with a spatial weight which takes the form of an inverted Gaussian.
The inverted-Gaussian-spatial bilateral filter, which uses an inverted-Gaussian function as the kernel of spatial filter, can remove small spots in large smooth areas efficiently.

2 Claims, 2 Drawing Sheets

OTHER PUBLICATIONS

Sylvain Paris et al.: "A Fast Approximation of the Bilateral Filter Using a Signal Procwssing Approach" Computer Vision—ECCV 2006 Lecture Notes in Computer Science;; LNCS, Springer-Verlag, BE, vol. 3954, 2006, pp. 568-580, XP019036567.

O'Malley, S.M. et al., "Image-Based Frame Gating of IVUS Pullbacks: A Surrogate for ECG", IEEE International Conference on Acoustics, Speech and Signal Processing, Apr. 4, 2007, pp. 433-436.

* cited by examiner

SPATIAL DIFFUSION IN IMAGES

This application claims the benefit, under 35 U.S.C. §119 of EP Application 07301345.0, filed Sep. 6, 2007.

FIELD OF THE INVENTION

The invention is related to spatial diffusion in images. Spatial diffusion is used for rendering images, especially but not exclusively for non-photorealistic rendering (NPR). Spatial diffusion helps blurring small discontinuities. Edges become sharper by spatial diffusion as well.

BACKGROUND OF THE INVENTION

NPR comprises stylization techniques for transforming natural images and/or videos into painterly styled or cartoon styled images and/or videos. In this specification, we will use the term image as referring to a still image as well as an image frame in a video sequence.

Primarily, stylization was applied for artistic purposes only. But, as styled images comprise less details and/or larger areas of uniform pixel stylization it is used for efficient visual telecommunication, also. A stylized image comprises a smaller high frequency portion than the corresponding natural image. Therefore, it is better compressible. A decoded stylized image comprises less annoying artefacts than the corresponding natural image compressed with the same compression rate.

A common technique for spatial diffusion is iterative Gaussian spatial bilateral filtering.

In visual telecommunication, it is important that stylization is achieved in real time.

Thus, there is a need for efficient stylization techniques.

SUMMARY OF THE INVENTION

This is achieved by a method for spatial diffusion in an image, the method comprising the features of claim 1.

Said method comprises applying an inverted Gaussian spatial bilateral filter on the input image.

It is preferred that the inverted Gaussian spatial bilateral filter comprises a spatial weight which takes the form of an inverted Gaussian.

The inverted Gaussian spatial bilateral filter, which uses an inverted-Gaussian function as the kernel of spatial filter, can remove small spots in large smooth areas more efficiently than traditional Gaussian-spatial bilateral filter. In a single pass, it achieves blurring and edge sharpening comparable to that achievable with traditional filtering in several passes.

The inverted-Gaussian-spatial bilateral filter is suited especially for NPR but might be useful in photorealistic rendering, as well.

Preferably, the method further comprises receiving a user input and applying on the input image a mean shift modification instead of the inverted Gaussian spatial bilateral filter in dependency on the user input.

This allows a user for switching between a computationally more efficient spatial diffusion method and an aesthetically more attractive spatial diffusion method.

BRIEF DESCRIPTION OF THE DRAWING

An exemplary embodiment of the invention is illustrated in the drawing and is explained in more detail in the following description.

In the figure.

DETAILED DESCRIPTION OF THE INVENTION

Figure 1:
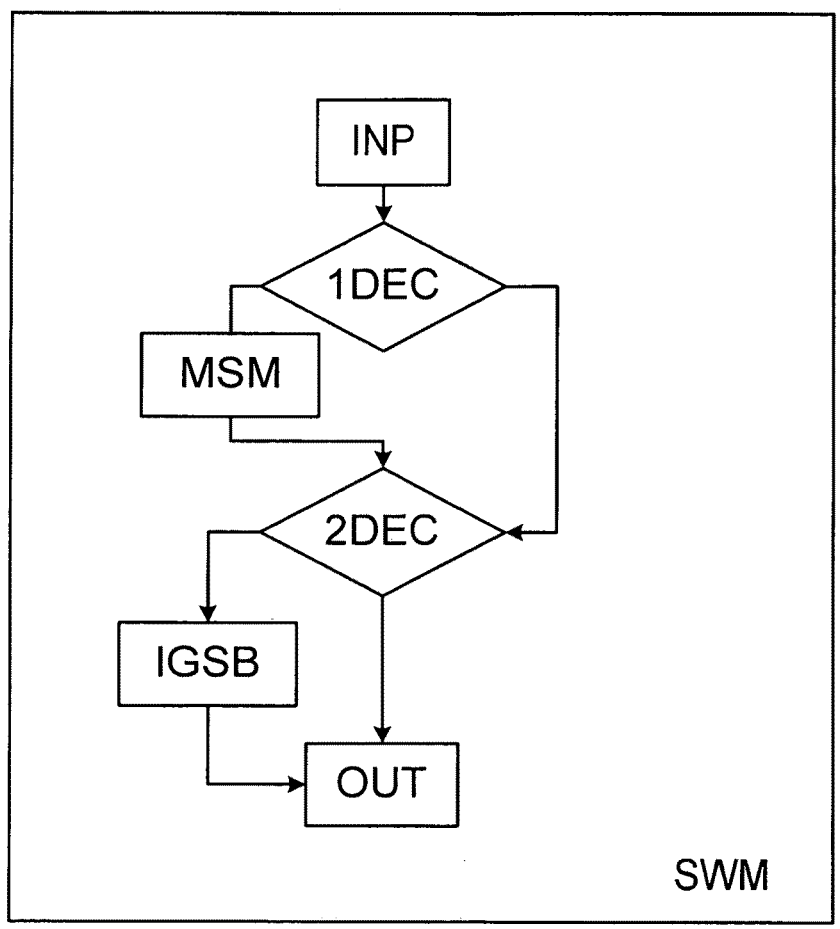
FIG. 1 shows a flowchart of an exemplary spatial diffusion method allowing a user to switch between different spatial diffusion techniques

In an exemplary embodiment of FIG. 1, spatial diffusion is realized in a switching method SWM. This switching method SWM allows a user to switch between two different spatial diffusion techniques. That is, the user may decide whether s/he prefers highly aesthetic cartoon effects over efficient computation or vice versa.

The switching method SWM also allow for performing both spatial diffusion techniques in parallel. So stylization of a common source image for different applications like preparation for streaming on wireless devices and preparation for movie theatre presentation can be done, both.

In a first step INP, an input image and the user's choice on the spatial diffusion techniques which shall be applied to the input image are received. Then, in a first decision step 1DEC it is decided whether the user's choice comprises application of a mean shift modification. If so, step MSM, which performs the mean shift modification, is executed and the method passes on to a second decision step 2DEC. Otherwise, step MSM is skipped and the method passes directly to the second decision step 2DEC. In step 2DEC it is decided whether the user's choice indicates execution of inverted Gaussian spatial bilateral filtering. If so, the method transits to inverted Gaussian spatial bilateral filtering in step IGSB. Then the results of mean shift modification and/or inverted Gaussian spatial bilateral filtering are outputted in step OUT.

The different spatial diffusion techniques are explained in detail below.

Mean Shift Modification

If highly aesthetic cartoon effects are desired, a mean-shift algorithm adapted for a graphic processing unit (GPU) is applied for spatial diffusion. For a given center pixel $C_n=(x_c, y_c, L_c, a_c, b_c)_n$ with spatial components x and y and colour components L, a and b in CIE-Lab color space, a mean-shift vector $m_{h,G}(C)$ is calculated as follows:

$$m_{h,G}(c_n) = \frac{\sum_{s\in\Omega} s * g_h(s, c_n)}{\sum_{s\in\Omega} g_h(s, c_n)} - c_n \qquad (1)$$

wherein $s=(x_s, y_s, L_s, a_s, b_s)$ is one of the surrounding pixels in a set of pixels $\Omega$ around center pixel $C_n$ wherein the pixel set $\Omega$ comprises only those pixels which are in a vicinity of the current center pixel and have a color space distance to the center pixel which is below a given threshold:

$$(L_s-L_{cn})^2+(a_s-a_{cn})^2+(b_s-b_{cn})^2 < T \; \forall s\in\Omega \qquad (2)$$

Good results were achieved with T=20.

$g_h(\cdot)$ is a profile of a kernel function $G(\cdot)$:

$G(x)=\alpha * g_h(\|x\|^2)$ with a normalising constant $\alpha$. $g_h(\cdot)$ depends on parameter h:

$$g_h(a, c_n) = g\left(\left\|\frac{c_n - a}{h}\right\|^2\right) \qquad (3)$$

The kernel function is determined by help of a Sobel operator.

After calculation of the mean shift vector the center pixel is shifted by the mean shift vector spatially and/or in one or more color dimensions. Calculation and shifting is repeated until the mean-shift vector equals Zero. In the mean shift filtered final image, the colour components of convergence ($L_{con}$, $a_{con}$, $b_{con}$) are assigned to a pixel $p_{after}$ at the position ($x_{c0}$,$y_{c0}$) of the initial center point $c_0$:

$$p_{after}=(x_{c0},y_{c0},L_{con},a_{con},b_{con}) \qquad (4)$$

In practice, repetition is terminated as soon as the mean-shift vector is below a shifting threshold.

Such mean shift filtering may be applied to some or all pixels.

Figure 2:
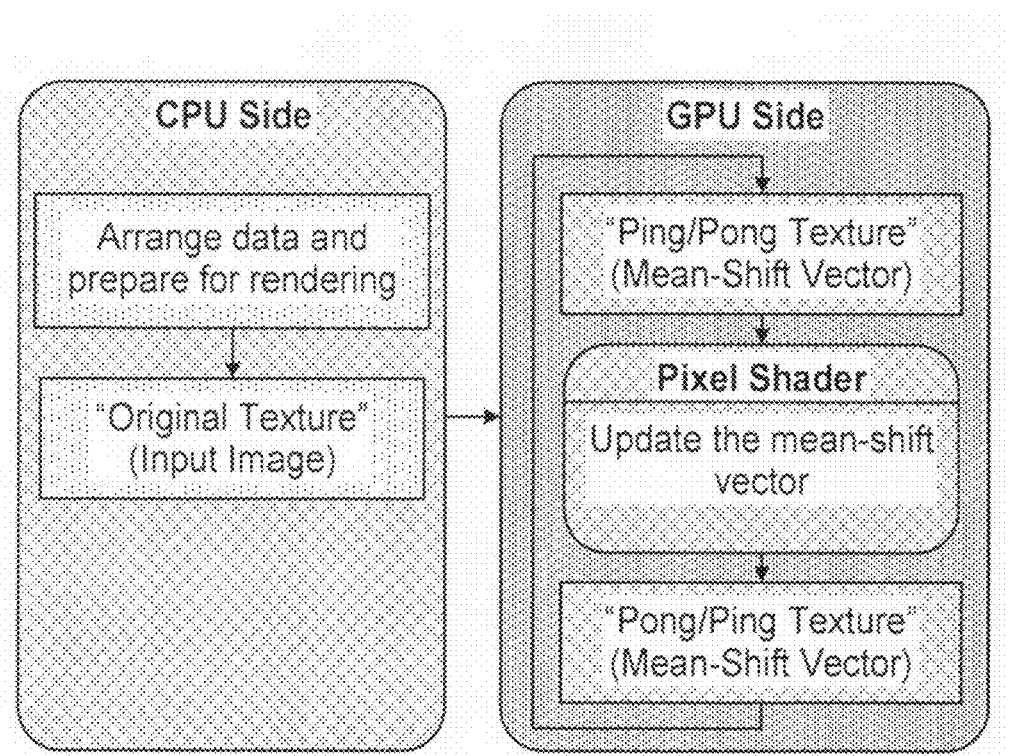
FIG. 2 shows a workflow of an exemplary Mean-shift modification.

The GPU-Version mean-shift algorithm used in the exemplary embodiment terminates after a fix number of iteration, independent from the mean-shift vector values. By doing so, the algorithm could be implemented on GPUs much easier and with great improvement of computational efficiency. The workflow is shown in FIG. 2. On side of a central processing unit (CPU), data is arranged and a rendering environment is initialized. The "Original Texture" stores a current input image frame. On side of a graphic processing unit (GPU), mean-shift vectors are updated iteratively in a pixel shader. The "Ping Texture" and the "Pong Texture" are used during the iterative rendering. The number of the iterations is fixed. Good results were achieved with five iterations over a window size of 10×10.

The results were highly aesthetic with cartoon-like effect justifying an increased computational effort due to a larger filtering window and a higher number of iterations compared to bilateral filtering.

Inverted-Gaussian-Spatial Bilateral Filtering

Alternatively, if efficient computation is preferred over aesthetics, an adapted bilateral filter is applied.

Bilateral filters have the attribute of preserving crisp edges.

The intensity change $dI_{\Omega'}(c)$ of a pixel c due to bilateral filtering over an area $\Omega'$ could be derived in a generalized form as follows:

$$dI_{\Omega'}(c) = \frac{\sum_{a\in\Omega'} I(a)g(I(a),I(c))f(P(a),P(c))}{\sum_{a\in\Omega'} g(I(a),I(c))f(P(a),P(c))} - I(c) \qquad (5)$$

Here, a is a neighbouring pixels in a window $\Omega'$ around pixel c, and I(·) returns a pixel's intensity value of one of the CIE-Lab colour space colour components in the input picture. P(·) returns the position of a pixel, f(·) is a spatial filtering function and g(·) is an intensity filtering function.

Bilateral filtering is often iterated until intensity changes drop below a chosen filtering threshold or even until they reach zero.

The inverted-Gaussian-spatial bilateral filter uses for spatial filtering the following filtering functions which takes a curve of inverted Gaussian:

$$f(P(a)-P(c)) = C - e^{-\frac{1}{2}\left(\frac{D(P(a),P(c))}{\sigma_d}\right)^2} \qquad (6)$$

wherein D(·) is a distance function like Euclidean distance or absolute distance. Good results were achieved with an Euler distance function E(·) returning the Euler distance between two pixels. C is a freely selectable constant. Good results were achieved with C=2.

By using an inverted Gaussian filter function a larger area is taken into account for filtering whereby the area directly surrounding the pixel subject to filtering is taken less into account. Given, there is a small spot of a first colour within a large area of a continuous colour which is different from the first colour. Then, closely located pixels of the spot do contribute less to the filtering of a spot pixel than with a standard Gaussian filter function. At the same time, more distant pixels of the continuous colour contribute more to the filtering than with a standard Gaussian filter function. Therefore, the inverted Gaussian filter contributes to an improved removal of spots from large areas with continuous colours.

For intensity filtering the following filtering function gave good results:

$$g(I(a)-I(c)) = e^{-\frac{1}{2}\left\|\frac{I(a)-I(c)}{\sigma_r}\right\|^2} \qquad (7)$$

Thus, within the exemplary embodiment the intensity $I'_{\Omega'}(c)$ of a pixel c after inverted Gaussian spatial bilateral filtering over an area $\Omega'$ is determined as:

$$I'_{\Omega'}(c) = \frac{\sum_{a\in\Omega'} I(a) e^{-\frac{1}{2}\left\|\frac{I(a)-I(c)}{\sigma_r}\right\|^2} \left(2 - e^{-\frac{1}{2}\left(\frac{D(P(a),P(c))}{\sigma_d}\right)^2}\right)}{\sum_{a\in\Omega'} e^{-\frac{1}{2}\left\|\frac{I(a)-I(c)}{\sigma_r}\right\|^2} \left(2 - e^{-\frac{1}{2}\left(\frac{D(P(a),P(c))}{\sigma_d}\right)^2}\right)} \qquad (8)$$

wherein $\sigma_d$ is related to the blur radius and so determines the window $\Omega'$ and $\sigma_r$ is related to the extent of the intensity filtering. With $\sigma_r$=4.5 and $\sigma_d$=2.5 good results were achieved. Filtering for some or all colour components in CIE-Lab colour space is performed.

The spatial diffusion step blurs small discontinuities and sharpens edges within each frame, guided by a nonlinear diffusion function that varies over the image.

What is claimed is:

1. Method (SWM) for generating a spatial diffused image from an input image using an electronic computing device, the method comprises
applying a mean shift modification on the input image or an inverted Gaussian spatial bilateral filter on the input image in response to a user input,
wherein the mean shift modification includes the calculation of a mean-shift vector from a set of pixels around a center pixel of the input image, the pixels of the set of pixels having a color space distance to the center pixel which is below a given threshold.

2. Method (SWM) according to claim 1, wherein the inverted Gaussian spatial bilateral filtering comprises a spatial weight which takes the form of an inverted Gaussian.

* * * * *